Dec. 28, 1926.
L. W. SERRELL
ELECTRIC RANGE
Filed May 16, 1925 2 Sheets-Sheet 1
1,612,065
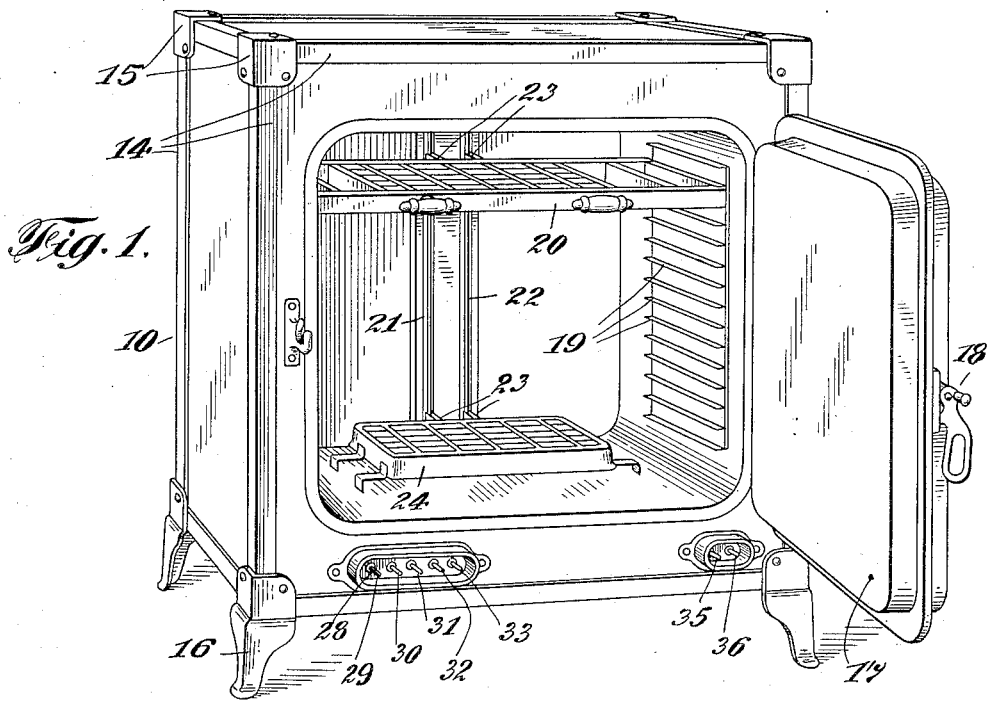
Fig. 1.
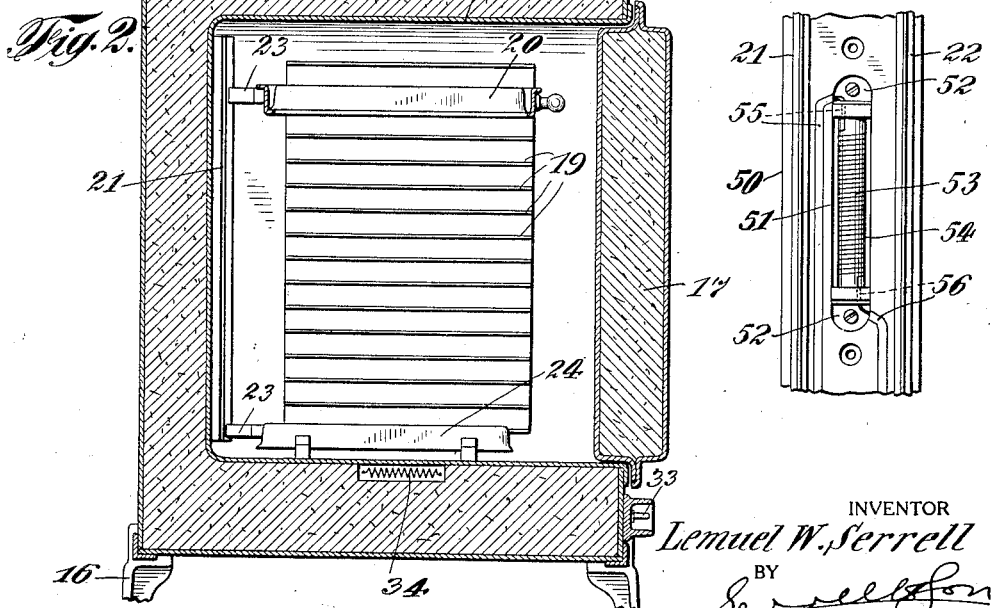
Fig. 2.
Fig. 3.
INVENTOR
Lemuel W. Serrell
BY
Serrell Son
ATTORNEYS Dec. 28, 1926.

L. W. SERRELL

ELECTRIC RANGE

Filed May 16, 1925    2 Sheets-Sheet 2

1,612,065

INVENTOR
Lemuel W. Serrell
BY
his ATTORNEYS

Patented Dec. 28, 1926.

1,612,065

UNITED STATES PATENT OFFICE.

LEMUEL W. SERRELL, OF NEW YORK, N. Y.

ELECTRIC RANGE.

Application filed May 16, 1925. Serial No. 30,659.

My present invention relates to an electric range so constructed that it may be employed for the usual and ordinary cooking operations, and may also be employed as a fireless cooker. The present case relates more particularly, to the features of the range whereby the fireless cooking operation is made possible.

Heretofore, in fireless cooking apparatus it has been customary to provide a heat insulated chamber or oven, and a heat reservoir adapted to be placed therein, and to be heated exteriorly of the chamber or within the same. Also so far as I am aware, it has been customary heretofore to employ a slab of soapstone as this heat reservoir element of the cooker. The soapstone or other heating reservoir element after being preheated to the required temperature is placed in the chamber with the articles of food to be cooked, and in fireless cooker practice the soapstone cools off, giving up its heat to compensate for the losses of heat from the chamber, due principally to conduction and radiation. The temperature of the heat reservoir whether of soapstone or some other substance is constantly lowered by these heat losses, until the temperature within the chamber is lowered below the cooking point, and it finally cools off to the room temperature. It is necessary therefore, as will be readily understood for the heat stored in the reservoir to be amply sufficient to maintain the temperature of the chamber above the cooking point for a period sufficient to adequately cook the articles of food being thus prepared, as without the soapstone the oven heat would escape too rapidly to do the cooking. In common practice also this stored heat is still sufficient after the articles have been cooked to maintain the temperature sufficiently high to keep the articles hot enough to serve until meal time. The use of soapstone for example, as a heat reservoir, while satisfactorily performing the intended function is disadvantageous in many respects, for example, the time consumed in adequately heating the soapstone is considerable; the soapstone slab readily chips and breaks, and it also occupies space in the chamber or oven, which, were it not used, would increase the food capacity of the oven.

I have found in carying out my invention that an electric range may be provided with a primary heat coil to quickly raise the temperature in the chamber, or oven thereof, to the desired or necessary cooking point, and that by the use of an additional or auxiliary compensating heat coil the temperature of the oven may be caused to drop in substantially the same manner as in the use of a heat reservoir made of soapstone or similar material, and in fact, that substantially the same effects or cooling curve may be obtained as in the use of the form of heat reservoirs commonly employed.

In carrying out my invention therefore, I dispense entirely with the use of a soapstone or other like heat reservoir and in a heat insulated chamber I employ electric heat coils which are so proportioned relatively to each other, and to the heat insulating qualities of the walls, or other means enclosing the chamber, that when the coils are used consecutively they are adapted respectively to create and maintain a temperature above the cooking point in the chamber long enough to do the cooking and to permit the oven enclosure to cool off at practically the same rate as obtained when using the soapstone, with the added advantage that the oven enclosure does not finally become stone cold; while its cost of operation is practically the same under service conditions as when the soapstone is in use.

In the drawing:

Fig. 1 is a perspective view illustrating an electric range made in accordance with my invention.

Fig. 2 is a sectional elevation of the same.

Fig. 3 is a partial elevation illustrating an additional manner in which the auxiliary coil may be placed in the range.

Figure 4:
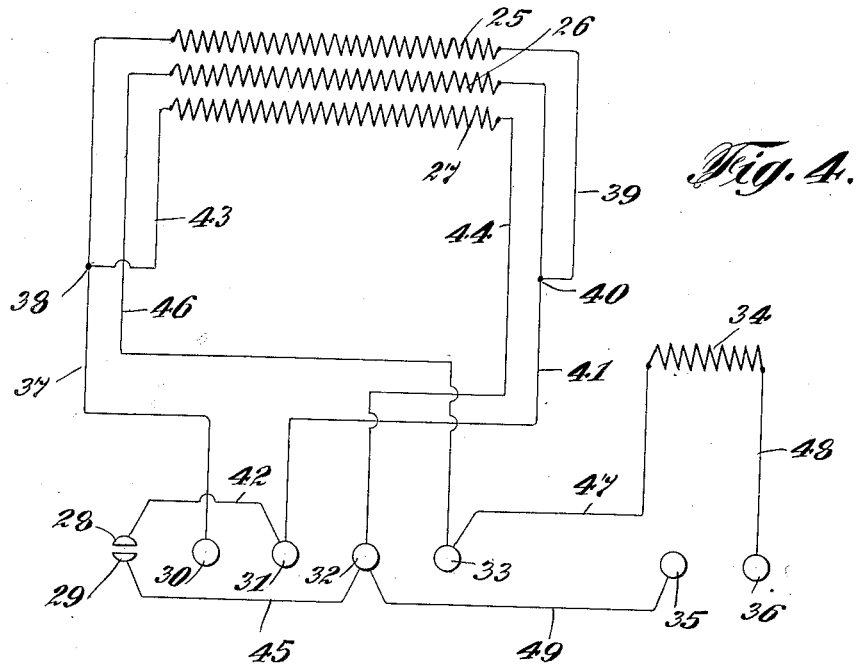
Fig. 4 is a diagrammatic view of the heat coils employed in the fireless cooker feature of the range.

As will be seen by reference to the drawing, the electric range made in accordance with my invention, preferably comprises a body 10, having spaced sheet metal or other walls 11 and 12, between which there is a packing of any suitable heat insulating material as indicated at 13. It will be understood that the walls are so formed as to enclose an oven or cooking chamber, which is a heat insulated enclosure. As illustrated, the edges of the walls may be trimmed with rails 14, and the corners fitted with brackets 15, both made of metal or other suitable material. The range also may be mounted on suitable feet 16, and as is customary, is provided with a door 17, normally maintained in a closed or shut position by a suitable latch 18. It will furthermore be understood that there may be a suitable heat insulating liner employed between the edges of the door and the adjacent portions of the range.

Within the range and in oppositely disposed positions I provide a plurality of spaced ledges 19 arranged in pairs in the customary manner, so that each pair is adapted to receive and support a rack upon which cooking vessels or dishes may be placed. These ledges are also adapted to receive and support a heater element 20, fitted with suitable coils which are adapted in any position to be electrically connected to conductor bars 21 and 22, by means of sockets 23 or otherwise, in order that the heater element 20 may be placed in any desired position, that is, upon any pair of ledges within the range, and the heat coils therein electrically connected to a suitable series of power, when the heater element is in place in any one of the various positions it may be caused to assume. The parts of the range as hereinbefore described form no part of my present invention.

In carrying out the invention the range made in accordance therewith, is also provided with a heater element 24. This heater element is suitably fitted with a plurality of coils. As illustrated, this heater element contains three coils made in any suitable manner, and designated at 25, 26 and 27, these coils being adapted to be employed singly or in multiple, or in series with each other as hereinafter described, in order when connected to a suitable series of power to provide for the creation of different temperatures within the cooking chamber of the range. As illustrated, the heater element 24 is placed in the bottom of the range, and as will be understood the range may be provided with a deflector plate, which when desirable may be placed between the heater element, and the bottom or floor of the range.

To make the necessary connections the range in any suitable position is provided with a plurality of terminals. The terminals for making connections with the heat coils 25, 26 and 27 are indicated at 28 and 29, which is a split or divided terminal, and 30, 31, 32 and 33.

The range also includes an auxiliary or compensating heat coil 34, which as illustrated in Fig. 2 may be placed in a recess in the bottom wall of the range. The terminals for making connections with this auxiliary heat coil are designated at 35 and 36.

In the operation of the range and to produce different temperatures therein, the heat coils 25, 26, 27 and 34 are connected in various manners, there being the necessary lead wires connecting these heat coils to the several terminals. As illustrated, the arrangement of the heat coils provides for four different heats, for example, to obtain a relatively high heat, the heat coils 25 and 27 are connected in parallel by placing a plug across the terminals 28, 29 and 30; assuming terminal 30 to be the positive terminal, the current will then pass by way of the lead wire 37 to the junction point 38, where a portion of the current passes by way of the coil 25 to the lead wire 39 to the junction point 40 and the lead wire 41, and through the lead wire 41 to the terminal 31, thence, by way of the lead wire 42 to the terminal 28; the other branch of this circuit is by way of the lead wire 43 through the heat coil 27 by way of the lead wire 44 to the terminal 32, and thence to, and through the lead wire 45 to the terminal 29. To obtain a medium heat coil 25 is used alone. In the use of this coil alone a plug is placed across the terminals 30 and 31; assuming the terminal 31 to be the positive terminal the current in this instance passes by way of the lead 41, the lead 39 to, and through the heat coil 25 to the lead 37, and thence, to the terminal 30. To obtain a low heat the coils 25 and 27 are employed in series; to effect this use of the coils the plug is placed across the terminals 31 and 32, assuming the terminal 32 to be the positive terminal the current in this instance passes by way of the lead 44, to and through the coil 27, thence to the lead 43, the junction point 38, through the lead to and through the coil 25 to the lead 39, the lead 41, and thence to the terminal 31. To obtain a very low heat of three of the coils, 25, 26 and 27 are employed in series. In effecting this use of the coils a plug is placed across the terminals 32 and 33; assuming the terminal 33 to be the positive terminal, in this use of the coils the current will pass by way of the lead 46 to, and through the coil 26, through the lead 41 to the junction point 40, through the lead 39 to, and through the heat coil 25 to the lead 37 to the junction point 38, to the lead 43 to, and through the heat coil 27, and by way of the lead 44 to the terminal 32. In this use of the coils the auxiliary coil 34 may also be included in the circuit by placing the plug across the terminals 35 and 36, when as will be understood a part of the current will pass by way of the lead 47 to, and through the auxiliary heat coil 34 to the lead 48, the terminal 36, through the plug 35, and thence by way of the lead 49 to the terminal 32.

Figure 5:
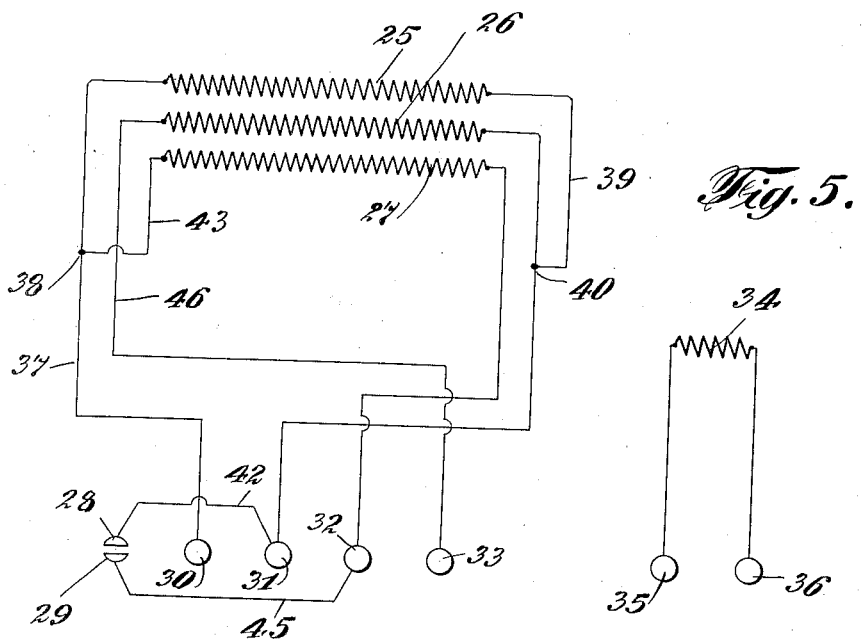
Fig. 5 is a similar view showing another arrangement of the heat coils.

In the practice of the invention this is the manner in which I prefer to connect the heat coils, and to operate the same, although as will be understood in some instances it may be desirable to use and connect the auxiliary heat coil in a manner entirely inde pendent of the coils in the heat element 24 and as shown in Fig. 5. It will also be understood that while I prefer to locate the auxiliary heat coil 34 in a recess provided therefor, immediately below the floor lining of the oven, it is possible, and in some instances it may be desirable to place the heat coil in other positions. As illustrated in Fig. 3 for example, the back of the oven may be fitted interiorly with an insulating base 50, in which the conductor or bus bars 21 and 22 are mounted, and which is provided with a centrally disposed longitudinal recess 51. At its ends there are internal projections in the recess adapted to function as the supports for brackets 52, provided at the ends of a spool 53, upon which the auxiliary or compensating coil 54 is wound. The brackets 52 may be secured to the projections by bolts or in any other suitable manner so as to make the coil readily removable, and replaceable when necessary. The brackets 52 furthermore may act as terminals for lead connections 55 and 56 for the auxiliary or compensating coil, in order to connect them to the terminals 33 and 36 as illustrated in Fig. 4, or to the independent terminals 35 and 36, as indicated in Fig. 5.

In the use of the electric range made in accordance with my invention, and more particularly, in the use of the fireless cooker elements thereof, one or more of the coils in the heater element 24 may be employed to raise the temperature in the chamber of the range to the desired point. This as will be appreciated is accomplished in a relatively short time, in not only raising the temperature to the desired point, but also heating the walls of the range, and the food within the oven, provided it has not been preheated to this desired or required temperature, which is necessarily considerably higher than the cooking point. After the desired temperature has been reached the coils in the heater element may be disconnected, and the auxiliary or compensating heat coil connected. The compensating heat coil is so designed and proportioned relatively to the coils in the heater element, and to the insulating qualities of the walls of the range as to compensate for the heat losses, due to conduction and radiation, and to maintain the temperature within the chamber of the oven at a point above the cooking point for a predetermined period of time, so that substantially the same results are obtained as in the use of a soapstone heat reservoir, that is to say, that an oven having predetermined heat insulating qualities when heated to a predetermined temperature will by the use of the auxiliary or compensating heat coil have a temperature maintained therein, which is higher than the cooking temperature, sufficiently long to adequately finish or accomplish the cooking of articles of food to be prepared, and furthermore, for an indefinite period will keep the food sufficiently hot to serve. In the use of heat reservoirs of soapstone or similar material the temperature of the chamber in the range is maintained above the cooking temperature for a predetermined period, after which it falls below the cooking temperature, and inasmuch as the soapstone heat reservoir constantly gives up the heat stored therein to compensate for the heat losses; eventually, it is cooled to substantially the same temperature as the room, and in this respect the practice of my invention differs radically from that of the use of soapstone heat reservoirs, inasmuch as the compensating coil may be so designed as to maintain a predetermined temperature within the chamber of the range for an indefinite period, or substantially as long as the compensating coil is employed, although as will be understood the compensating coil may be so designed that in passing a predetermined current through the same as hereinbefore described, substantially the same cooling effect may be obtained as that in the use of the soapstone heat reservoir.

In the use of the electric range as hereinbefore described, the plurality of primary coils are employed to obtain different cooking temperatures, all of which are higher than the necessary cooking point when the apparatus is utilized for ordinary cooking purposes, and any one of these coils as will furthermore be understood may be employed without the use of the other. In other words, the range may be fitted with only one primary coil, and an auxiliary or compensating coil for the purposes of utilizing the apparatus as a fireless cooker in carrying out the present invention.

I claim as my invention:

1. In an electric range, a heat insulated enclosure, and heat elements therein used consecutively to create a temperature materially above the cooking point and then by compensating for heat losses to maintain the temperature substantially above the cooking point for a predetermined period.

2. In an electric range, a heat insulated enclosure, and heater elements therein so proportioned relatively to each other and to the heat insulating effect of the enclosure that when the heater elements are used consecutively they respectively create a temperature materially above the cooking point in the enclosure and then, by compensating for the heat losses, maintain a temperature appreciably above the cooking point in the enclosure for a predetermined period.

3. In an electric range, a heat insulated enclosure, and heat coils therein so related to each other and to the heat insulating effect of the enclosure that when used consecutively the heat coils first create and maintain for a predetermined period a temperature materially above the cooking point in the enclosure and then, by compensating for the heat losses, maintain a temperature substantially above the cooking point in the enclosure for a predetermined period.

4. In an electric range, heat insulating walls enclosing a cooking chamber, a heat coil for creating and maintaining a temperature materially above the cooking point in the said chamber, and an auxiliary coil for compensating for the heat losses to maintain a temperature substantially above the cooking point in the said chamber for a predetermined period after the first aforesaid coil has been turned off.

5. In an electric range, heat insulating walls enclosing a cooking chamber, a heat coil adapted to create and maintain in the said chamber one of a plurality of predetermined temperatures all of which are materially above the cooking point, and an auxiliary heat coil which by compensating for the heat losses is adapted to maintain a temperature substantially above the cooking point in the said chamber for a predetermined period after the first aforesaid coil has been turned off.

6. In an electric range, a heat insulated enclosure, heating elements therein so proportioned that when used consecutively, the temperature of the enclosure may be first raised to a predetermined degree above the cooking point, and then by compensating for the heat losses, so control the rate of cooling of the enclosure that the temperature therein may be maintained above the cooking point for a predetermined period of time.

Signed by me this 5th day of May, 1925.

LEMUEL W. SERRELL.